J. A. LOVINGTON.
TOY VEHICLE.
APPLICATION FILED JAN. 22, 1920.

1,363,891.

Patented Dec. 28, 1920.

INVENTOR
Julius A. Lovington
BY
John A. Bergstrom
ATTORNEY

UNITED STATES PATENT OFFICE.

JULIUS A. LOVINGTON, OF PORT RICHMOND, NEW YORK.

TOY VEHICLE.

1,363,891. Specification of Letters Patent. Patented Dec. 28, 1920.

Application filed January 22, 1920. Serial No. 353,268.

*To all whom it may concern:*

Be it known that I, JULIUS A. LOVINGTON, a citizen of the United States, and resident of Port Richmond, in the county of Richmond and State of New York, have invented certain new and useful Improvements in Toy Vehicles, of which the following is a specification.

This invention relates to a toy vehicle constructed in the form of an automobile and which is especially suitable for the amusement of children.

The invention is designed to include a sectional frame, made to collapse when the front end of the vehicle strikes against an object in its path.

The fundamental object of the invention is, to provide the forward end of the toy with a bumper actuated by the collision to operate a locking device for collapsing the frame.

Another object of the invention is, to provide the automobile with a pair of wheels removably mounted on one of the sections so that when the sections collapse, the wheels will drop off. The invention also includes a hood loosely mounted on the wheel supporting section, which is thrown off in simultation of a complete smash up.

The novel features of the invention are more fully described in the following specification and claims, and illustrated in the accompanying drawing in which:

Figure 1:
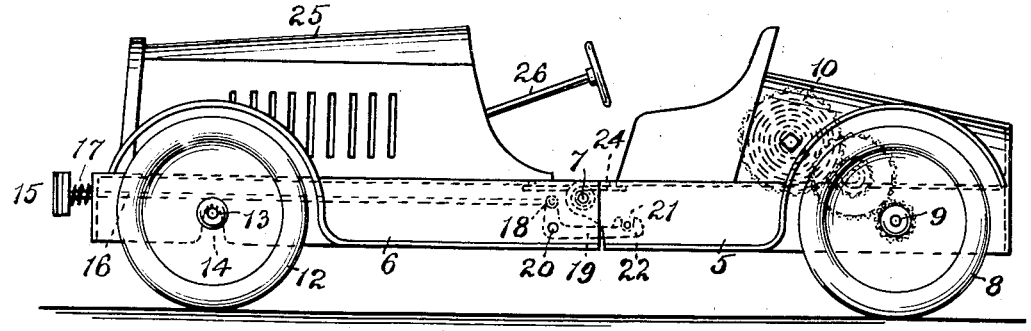
Figure 1 represents a side elevation of a vehicle embodying this invention.
Figure 2:
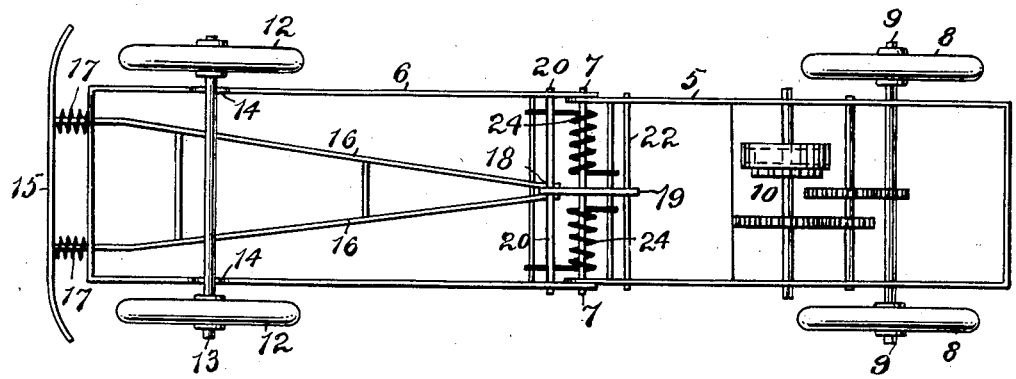
Fig. 2 is an inverted plan view of the same.

In the drawing the numeral 5 designates a rear frame or section, and 6 is a forward frame. These frame sections are pivotally connected together by means of a rod 7 extending transversely from one side to the other. The rear frame is supported on a pair of wheels 8 having an axle 9 mounted in the frame. The wheels are secured to the axle and they are rotated by a spring motor 10 geared or otherwise connected to the axle.

The forward frame is supported on a pair of wheels 12 having an axle 13 arranged in vertical slots 14 in the sides of the frame. Each slot has its entering or open end at the lower edge of the frame so that the axle with its wheels thereon will slide out of the slots at predetermined times depending on the position of the forward frame.

On the forward frame is arranged a bumper 15 secured to a pair of rods or links 16 sliding in the front end of the frame. Coiled springs 17 carried by each rod normally tend to press the bumper outward. The rear end of each rod is pivoted at 18 to the upper end of a bell crank lever 19 fulcrumed at 20 to the frame. A notch 21 located at the other end of the lever normally snaps into engagement by the expansion of the spring 17 with a transverse rod 22 fixed to the rear frame, thus locking the frame sections together.

Figure 3:
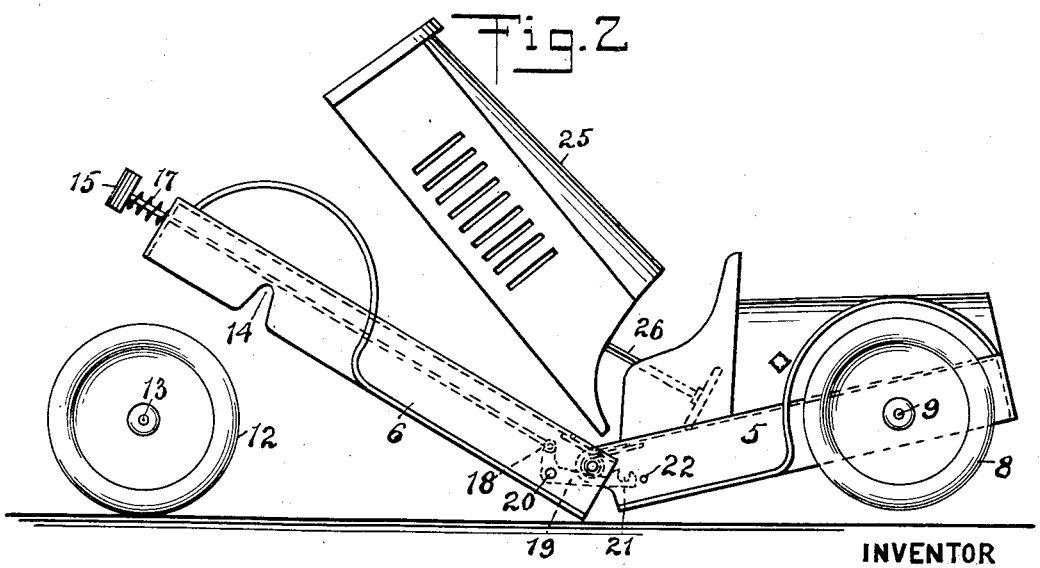
Fig. 3 is a view similar to Fig. 1 showing the frames collapsed.

Coiled springs 24 mounted on the pivot rod 7 will swing the forward frame upward as indicated in Fig. 3, when the bell crank lever is actuated by anything striking the bumper. A hood 25 is loosely mounted on the forward frame and a steering post 26 is carried by the hood.

It will be readily understood, from the foregoing description that when the spring of the motor is wound, it will drive the rear wheels to propel the car forward. Hence, when the spring bumper strikes any object impeding the car, it will move the bumper backward to unlock the bell crank lever, and the springs 24 will swing the forward frame upward, thereby collapsing the frames. The forward pair of wheels with the axle will fly out of the slots, best seen in Fig. 3. The hood also is thrown off the frame by the upward movement of the forward frame and the jar of the collision. The parts can be easily reassembled when it is desired to repeat the performance.

I claim:

1. In a toy vehicle the combination with a sectional frame having wheels mounted thereon, of means for normally locking the sections together, and means operatively connected to the locking means for collapsing the frame.

2. In a toy vehicle the combination with a sectional frame having wheels mounted thereon, of means for normally locking the sections together, and means connected to the locking means actuated by the impact of the vehicle against an object for collapsing the frame.

3. In a toy vehicle the combination with a rear frame, of a forward frame pivotally mounted on the rear frame, wheels for supporting the frames, means for normally locking the frames together, and means connected to the locking means actuated by the impact of the forward portion of the vehicle against an object for swinging the forward section of the frame upward.

4. In a toy vehicle the combination with a rear frame, of a forward frame pivotally mounted on the rear frame, wheels for supporting the frames, a bell crank lever for normally locking the frames together, and a bumper arranged at the front end of the frame for actuating the lever to swing the forward section of the frame upward.

5. In a toy vehicle the combination with a rear frame, of a forward frame pivotally mounted on the rear frame, wheels for supporting the frames, a bar fixed to the rear frame, a bell crank lever coacting with the bar to normally lock the frames together, a bumper arranged at the front end of the vehicle, and rods connecting the bumper with the lever for actuating the lever to swing the forward section of the frame upward.

6. In a toy vehicle the combination with a rear frame, of a forward frame pivotally mounted on the rear frame, wheels for supporting the frames, a bar fixed to the rear frame, a bell crank lever coacting with the bar to normally lock the frames together, a bumper arranged at the front end of the vehicle, rods connecting the bumper with the lever, and a coiled spring mounted on the pivot of the frame sections for swinging the forward section of the frame upward when the bumper is impinged by an object.

7. In a toy automobile the combination with a collapsible frame including an upwardly movable section having slots, a pair of wheels with an axle mounted in the slots, means for locking the frames and means operatively connected to the locking devices for collapsing the frames to automatically release the wheels.

8. In a toy automobile the combination with a collapsible frame having a pair of slots, a pair of wheels with an axle mounted in the slots, a removable hood arranged on the frame, and means for collapsing the frames to automatically release the wheels and the hood.

Signed at New York, in the county of New York and State of New York, this 17th day of January, A. D. 1920.

JULIUS A. LOVINGTON.